United States Patent [19]

Warman et al.

[11] 3,890,473

[45] June 17, 1975

[54] OPERATOR DISPLAY ARRANGEMENTS

[75] Inventors: Bloomfield James Warman, Como, Italy; Stephen Sidney Walker, Walderslade, England

[73] Assignee: GTE International Incorporated, Stamford, Conn.

[22] Filed: Jan. 14, 1974

[21] Appl. No.: 433,329

[30] Foreign Application Priority Data

Apr. 19, 1973 United Kingdom .............. 19183/73

[52] U.S. Cl. .......................................... 179/27 DB

[51] Int. Cl. .......................................... H04m 3/64

[58] Field of Search .................... 179/27 DA, 27 DB

[56] References Cited

UNITED STATES PATENTS

| | | | |
|---|---|---|---|
| 2,078,842 | 4/1937 | Friendly | 179/27 DB |
| 2,244,700 | 6/1941 | Horton | 179/27 DB |
| 2,284,870 | 6/1942 | Holden et al. | 179/27 DB |
| 2,341,934 | 2/1944 | Martin | 179/27 DB |
| 2,342,245 | 2/1944 | Bruce et al. | 179/27 DB |
| 2,344,612 | 3/1944 | Hartley | 179/27 DB |
| 2,532,750 | 12/1970 | Baker | 179/27 DB |
| 2,633,499 | 3/1953 | Wright | 179/27 DB |

*Primary Examiner*—Kathleen H. Claffy
*Assistant Examiner*—Randall P. Myers

[57] ABSTRACT

An arrangement for visually displaying to a telephone operator the condition of the lines served by a telephone exchange is disclosed. The display may be by a cathode ray tube or a matrix of light emitting diodes and the information displayed be the line state and class of service.

6 Claims, 8 Drawing Figures

OPERATOR DISPLAY ARRANGEMENTS

BACKGROUND OF THE INVENTION

The present invention relates to telephone exchanges and particularly to visual display arrangements for presenting information to an operator in a telephone exchange.

Although not necessary restricted thereto, the invention has particular application to Private Automatic Branch Exchange (PABX) systems which include one or more operator's positions for dealing with incoming calls from other exchanges and for providing assistance where necessary in the setting up of calls by extensions served by the PABX.

In modern PABX systems, a frequently specified requirement is for the provision of a visual "busy/free" extension display in association with the operator's position so that in answering an incoming call from another exchange, an operator can ascertain, by inspection of the busy/free display, whether or not the wanted extension is free to accept the call, and if not, can immediately inform the caller of this fact without the need to key or dial the wanted extension number and await receipt of the relevant signal indication. In the case of small key switched PABX systems, a busy/free display is often inherent in the design of the system, especially where each extension station has a key and indicating lamp individual to every other station served by the exchange. However, for larger systems which employ a central switching network common to all the extension stations and capable of serving up to 100 or more extension lines, the provision of a lamp display means capable of indicating the busy/free condition of each extension served by the exchange can become cumbersome and expensive, since generally, the provision of such a lamp display implies the provision of a separate power supply to light the lamps, the provision of a separate wire for each lamp in a cable linking the operator's console to the switching apparatus and the provision of a convenient mounting for the lamps, which must be capable of dissipating the heat from the lamps and be arranged fo facilitate the changing of the lamps as these rupture. Also, such a lamp display is relatively inflexible in that the display cannot readily be used to display other information which might usefully be provided.

SUMMARY OF THE INVENTION

It is one object of the present invention to provide an improved visual display arrangement for a telephone exchange operator, which is capable of performing display functions for a number of telephone lines and is of simple and economical construction.

It is a preferred object of the invention to provide such a display arrangement which is capable of performing a number of different display functions.

According to the present invention there is provided an arrangement for the display of information appertaining to the lines served by a telephone exchange, which comprises an electronic display means capable of displaying information by the stimulation of particular elements or areas thereof to a signal indicating condition, interface means for priming sequentially, in synchronism with signals from an address generating means for the successive and cyclic generation of telephone line address signals, individual elements or areas of said display means allocated to corresponding telephone line addresses, and means for applying to said display means an information signal or signals for stimulating elements or areas of said display means to said signal indicating condition, each information signal appertaining to a particular line address being so synchronized to said address generating means that in accordance with the particular element or area of said display means that is stimulated to said signal indicating condition the identity of the corresponding line address can be determined.

Preferably, said display means comprises an array of light emitting elements or areas the spatial disposition of which within the array is indicative of the corresponding telephone line address, and the said signal indicating condition of said elements or areas comprises a light emitting condition.

The display means may be linked to the associated telephone exchange switching apparatus over one of more data signalling highways and in one mode of operation the stimulation to a light emitting condition of respective elements or areas of the display means is effected by line information signals generated within the exchange apparatus and applied to the display means over a data signalling highway in time division multiplex under control of the address generating means. The exchange switching apparatus may generate line information signals appertaining to the line state and class-of-service of each of the telephone extension lines which it serves, for example, line state "free", "busy", "P.G." (parked) and so on and class-of-service "executive", "trunks barred", "number unobtainable" and so on and by making these information signals available on a time division multiplex basis, at peripheral terminals of the exchange apparatus, they can readily be applied to the display means whereby the display may be caused to indicate the line state or class-of-service appertaining to particular line addresses. In another mode of operation, a continuous control signal may be applied to the display means so as to cause each element or area of the display to be stimulated to a light emitting condition, sequentially in synchronism with the line address generation and in this mode the display may be used in conjunction with a so-called "light pencil," that is a light detecting photo-cell arrangement having the photo-cell located at one end of a pencil like holder, for the generation of line address marking signals, by means of which an operator may establish connection, via the associated exchange switching apparatus to any of the lines served by the exchange, without the need for keying or dialing any line identifying digits. Thus, in this mode of operation an exchange operator may cause a required connection to be established to a line served by the exchange, by first operating a switch to apply a continuous control signal to the display information input, thereby causing each element or area of the display to be stimulated sequentially in synchronism with the line address generation and by then applying the light-pencil to the appropriate element or area of the display. The photo-cell carried by the light-pencil is thus caused to respond to the recurrent stimulations of the respective element or area of the display and to produce corresponding output pulses whose time of occurence with respect to the line address generation indicates the address of the wanted telephone line.

Preferably, the address generating means is arranged to generate the address marking signals in two groups, one representing the "units" address digit and the other, the "tens" address digit, the display means being adapted to provide a separate line address indication for each 100 lines. Where the exchange concerned serves more than 100 lines, then the display means may be manually switched between 100 line groups by an associated manual switch means, the setting of which indicates the hundreds line address digit.

The display means may be constituted by a composite structure, such as a cathode ray tube, or it may be constituted by a matrix of separate light emitting elements, such as light emitting diodes. Where a cathode ray tube structure is employed the units and tens address marking signals would be applied, respectively, to the "X" and "Y" beam deflecting elements of the structure via suitable "staircase" wave form generating means, whereby the display comprises a raster of dotted or dashed lines of which each dot or dash represents a subscriber line served by the exchange, the intensity of illumination of the individual dots or dashes being controlled in accordance with information signals applied to a control electrode of the structure. Where the display means comprises discrete light emitting elements, these would be arranged to form a matrix with tens and units coordinates, connected to be energized in sequence from the tens and units line address marking signals, the information signals being gated with the units address marking signals to energize the respective light emitting elements.

BRIEF DESCRIPTION OF THE DRAWINGS

To enable the invention to be more fully understood, an embodiment thereof will now be described, by way of example, with reference to the attached diagrams, of which:

FIGS. 1, 3, 4, 4A and 4B, when oriented as illustrated in FIG. 6 illustrate the circuitry of the present invention.

DESCRIPTION OF THE PREFERRED EMBODIMENT

Figure 1:
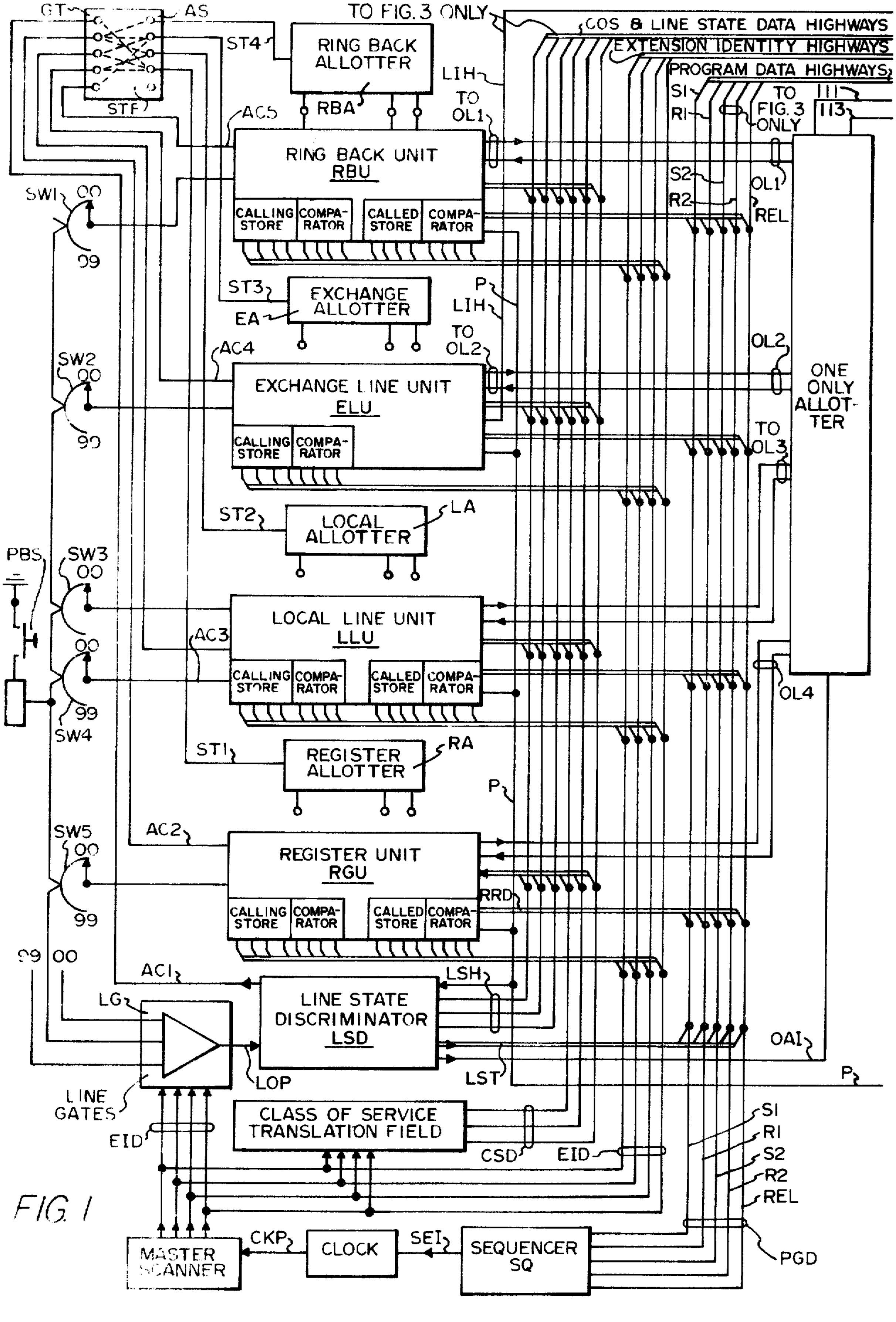
FIGS. 1 and 2, when oriented as illustrated in FIG. 5, illustrate the system to which the present invention is particularly applicable.

Referring to FIG. 1, the exchange system illustrated is designed for use as a small, 100 line, PABX capable of providing access to and from a main public exchange over a number of separate trunk lines.

In general the exchange system illustrated comprises a number of separate apparatus units and an associated system of data transfer highways. The apparatus units, shown in FIG. 1, comprise a register unit RGU, a local unit LLU, an exchange line unit ELU and a ring-back unit RBU. These are referred to as service units of the exchange and an exchange may include different service units, as required, and there may be a number of service units of each kind. The exchange also includes a number of control units, to which reference is made below. Each service unit includes a 100 outlet line coupling switch, as indicated by the switch banks SW1–SW5, and each unit also includes storage means for storing a calling extension number and, where appropriate, a called extension number. The line coupling switch and the store are integrated with one another so that the recording of an extension number, or identity, in a store also effects the setting of the associated switch to that extension telephone line. Each storage means also has an associated comparator by means of which the occurrence of a stored extension identity on an associated set of data highways can be recognized.

The service units are arranged to be allocated for use on a call, as required and for this purpose, each group of service units has an associated allotter means, as indicated at RA, LA, EA, and RBA, and the arrangement is such that each service unit of a group can control the allotter associated with one or more of the other service unit groups. Thus, the service units in the groups represented by the units RGU, LLU, ELU, and RBU as well as the common line state discriminator unit LSD, described below, each have one or more allotter calling leads such as the leads AC1, AC2, AC3, AC4 and AC5, shown towards the left hand side of FIG. 1. Similarly each of the allotters RA, LA, EA, and RBA has one or more start leads as indicated at ST1, ST2, ST3, and ST4, the allotter calling leads and the allotter start leads being selectively interconnected via the terminals GT and AS, in a strappable terminal field STF.

The common units of the exchange comprise a master scanner, a line state discriminator, a class-of-service translation field and a sequencer unit. The master scanner is driven by clock pulses supplied by a central clock and generates successively and cyclically the numerical identities of the 100 extensions served by the exchange. These identities are applied at each scanner step in the form of signal pulses on a group of extension identity highways EID, so that the tens and units digits of the identities are conveyed in parallel code form. These identities are applied to the storage and comparator elements of each of the service units, and are also applied to effect the sequential interrogation of a group of line gates LG. The sequencer, in effect, programs the operation of the exchange by determining the order in which data is transferred from one unit to another within the exchange. To this end a group of program data highways PGD is provided, over which program signals can be passed between the sequencer and other units of the exchange. The sequencer also provides an inhibiting output over the lead SEI to stop the central clock and hence arrest the scanning action of the master scanner wherever an operation is to be performed in respect of the line identity being generated by the master scanner at that time. The line state discriminator unit determines, from the line gate signals applied to it over lead LOP in respect of each line identity as it is generated, whether that line is calling for service, is free, busy (i.e. served or being served) or is in the so-called PG or parked condition, e.g., a line which has appeared as a calling line from which a register has timed out because of failure to receive dialed digits from the line. The free, busy and parked line conditions are signalled, in time division multiplex, from the line state discriminator over respective ones of a group of line state highways LSH, to which all service units have access. The extension identity highways EID are also connected to a class-of-service translation field (COS) which provides a further group of COS data highways, there being one data highway for each COS. Thus, as each identity is generated, a class-of-service signal appropriate to that extension, i.e., "Ordinary," NU (number unobtainable), trunks barred, Executive, etc., is applied on a TDM basis to the respective COS highway in the highway group CSD. In addition, a one-only allotter OA is associated with each of the service units and with the line discriminator unit, to ensure that only one unit can have access to the data highways for the purpose of information transfer, at any time.

In outline, the exchange system operates as follows. The master scanner operates to address all the extension stations in turn, driving the line gates, and at the same time offering the numerical identity codes successively and cyclically to all the stores and comparators in the service units of the exchange, over the extension identity highways EID. In step with the generation of these data addresses, supplementary data is also generated by the line state discriminator and class-of-service units, and applied to the data highways LSH and CSD respectively.

If a service unit of the exchange is already dealing with a call, it will have stored one or both of the numerical identities of the extension or extensions concerned and the stored identities are applied to the respective comparator. When a comparator detects coincidence between the stored identity and an identity appearing on the extension identity highways during successive cycles of the master scanner, the comparator produces a "yes" output signal which, inter alia, is applied to the exchange "P" wire to mark that extension identity busy to other service units of the exchange.

If the line state discriminator unit detects a new call requiring attention, it stops the scanner in the scan position corresponding to the calling extension identity by signalling the sequencer unit over the signalling lead LST and an appropriate one of the program data highways PGD. This causes the numerical identity of the calling subscriber to be staticized on the identity highways EID. At the same time a free register is allotted for use on the call by a signal passed from the LSD unit to the register allotter RA over the allotter calling and start leads AC1 and ST1 as previously described. The allotted register reads the staticized identity into its calling number store under control from the sequencer unit via the program data highways and the speech path switch SW5 is set to the calling line. The master scanner resumes its scanning action, while the register sends dial tone and accepts the dialed impulse trains of the wanted number. If the call is a local, extension to extension call this is indicated by the dialed prefix digit 2 and causes the register to store the called extension identity in its called number store. If the call is an external exchange line call, only the prefix digit 9 indicating this is recorded by the register.

When the register has received all the dialed digits required for a call, it transfers this information to another service unit of the exchange which is designed to deal with the type of call required. It does this in substantially the same manner as that just described for a new call, that is, the register stops the scanner at the scan position corresponding to the calling extension identity it wishes to transfer by signalling over a connecting lead RRD and the relevant program highway PGD. At the same time the register applies to the "one-only" allotter 0A for permission to use the data transfer highways, by signalling over the appropriate one of the pair of leads OL4 which extend between the register unit and the one-only allotter. When the data highways are free, the one-only allotter returns a "GO" signal to the register, upon receipt of which the register applys for a service unit of the type to which it wishes to transfer the information by now applying a signal to an allotter calling lead such as AC2 and an appropriate allotter start lead as determined by the strapping in of the programming terminal field STF, for example, the allotter start lead ST2 and the allotter LA for a local call or the allotter start lead ST3 and the allotter EA for an exchange line call. This results in a free one of the required group of service units being allocated and the identity code staticized on the identity highways EID read into its calling number store. If the register has further information to transfer, for example a called extension identity, the scanner is allowed to scan on until it reaches this second identity whereupon it is again stopped to enable the second identity to be read into the called number store of the allocated service unit. The register is then released and the scanner resumes its normal scanning action.

Figure 2:
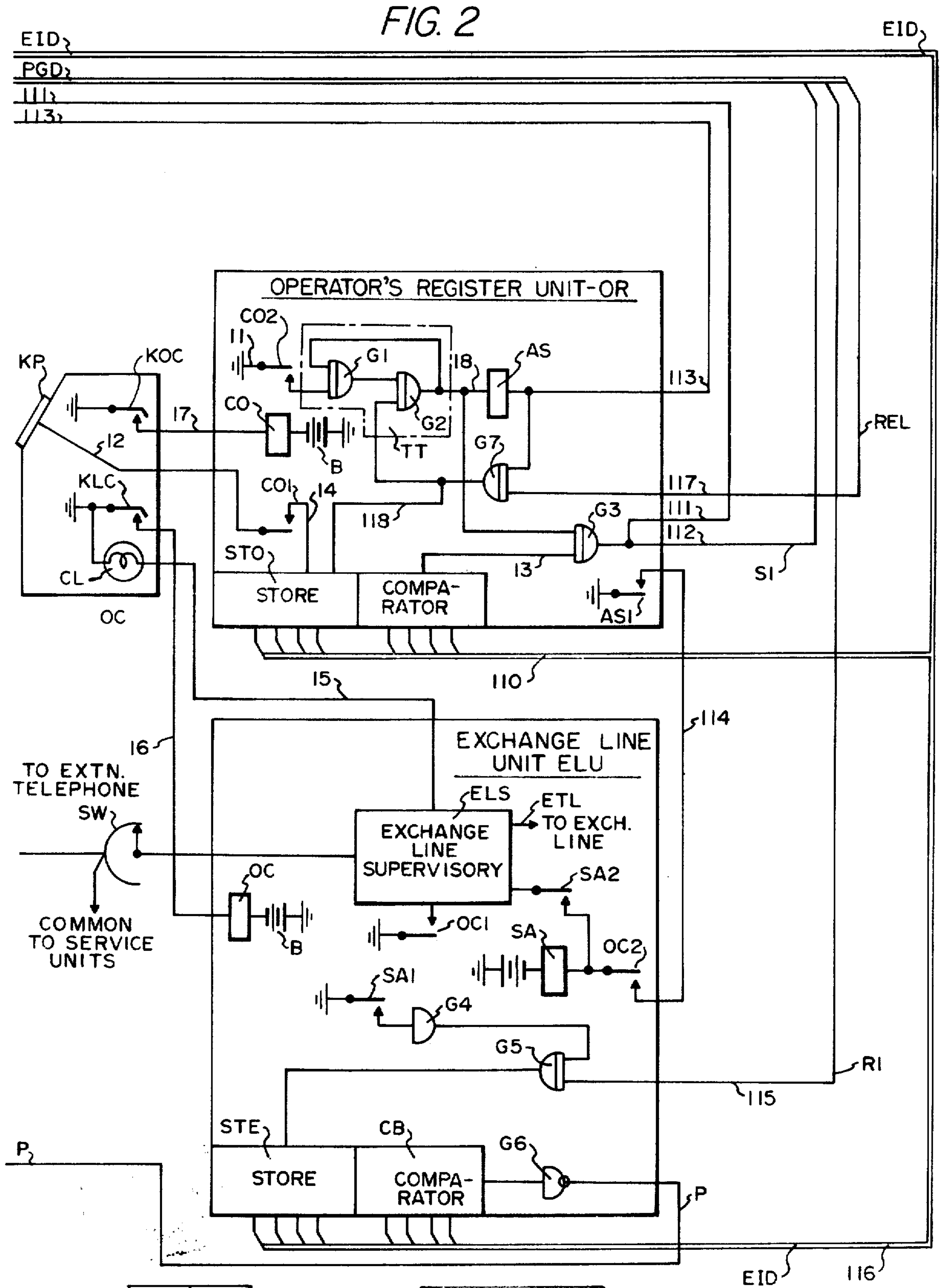
Figure 5:
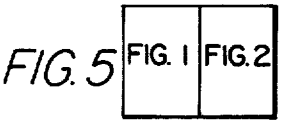
FIGS. 5 and 6 illustrate the manner in which the sheets of drawings should be oriented, for view during the explanation of the invention.
Figure 6:
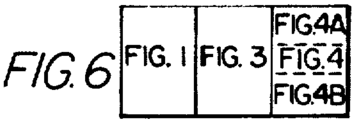

Referring now to FIG. 2, this shows sufficient of the circuit logic of an exchange line unit ELU and of an operator's console OC and operator's register unit OR to enable the operation of the PABX system of FIG. 1, for the setting up of calls incoming from an external public exchange to be understood. Again, the allotting arrangements described above with reference to FIG. 1, have been indicated in a simplified form to avoid unnecessarily complicating the description and drawings.

The operation of the FIG. 2 arrangements will be described without reference to the present invention, that is, as it would be in the absence of the display arrangements described below with reference to FIG. 4. For this purpose the operator's console OC includes a key-pad or dial KP, operator's register OR includes a storage means STO into which the operator can key or dial the digits identifying a wanted extension telephone of the PABX system, an associated comparator CA and connecting leads 12, 13, 14 and 110.

The exchange line unit ELU, which may be the same as that shown in FIG. 1, includes exchange line supervisory apparatus ELS of known form and within which an external exchange trunk line, indicated at ETL is terminated. The main functions of this supervisory apparatus will appear from the following description.

For the purpose of explanation, we will assume that a calling condition has occurred on the trunk line ETL. This is detected by the supervisory apparatus ELS which responds by applying interrupted signals over lead 15, to flash the calling lamp associated with this exchange line unit, in the operator's console OC. The exchange operator responds to the calling lamp signal by operating the associated line circuit coupling key KLC to apply ground potential over lead 16 to operate the exchange line unit coupling relay OC, via battery B and by operating an "answer" key, not shown to complete a speech path, also not shown, between her handset and the trunk line ETL. Relay OC operating, at contacts OC2 prepares an operating circuit for an allotting relay SA and at contacts OC1 prepares a holding circuit for relay SA. The operator now talks to the caller to ascertain the identity of the required PABX extension, whereupon she operates a key KOC to couple her console position to an operator's register unit OR and then proceeds to key or dial the wanted number. Operation of the key KOC applies ground over lead 17 to operate the register coupling relay CO through battery B which, as indicated diagrammatically by the contacts CO1, extends a signalling path over leads 12 and 14 between the key-pad KP and the register store STO, within which the tens and units digits of the wanted extension identity are stored. Relay CO operating, at contacts CO2 also applies a ground signal over lead 11, to set the bi-stable element TT, formed by the interconnected AND gates G1 and G2. Bi-stable TT setting, applies a signal over lead 18 to prepare for the operation of a coupling start relay AS and over leads 18 and 19 to prime AND gate G3. The comparator CA now has the wanted extension identity applied to it from the store STO and the extension identities sequentially generated by the master scanner, FIG. 1, applied to it from the extension identities EID over connecting leads indicated, diagrammatically, at 110. When the comparator detects coincidence between these identities, it applies a yes output signal over lead 13 to operate AND gate G3 from whose output a signal is applied over lead 111, to the one-only allotter, FIG. 1, and over lead 112 to the common sequencer element SEQ, FIG. 1. The sequencer responds to the signal on the S1 highway by applying an output signal over lead SEI to stop the master scanner, thereby staticizing the identity then being generated on the identity highways EID. The one-only allotter responds to the signal applied over lead 111, by returning a go signal over lead 113 to indicate that the register unit OR, FIG. 2, may proceed with a data transfer operation. In the set condition of bi-stable TT, the go signal on lead 113 effects operation of relay AS which, at contacts AS1 applies an allotting signal over lead 114 and the coupling relay contacts OC2 to operate the allotting relay SA through battery B in the operator coupled exchange line unit ELU. Relay SA operating in the exchange line unit, at contacts SA1, applies a ground signal, via inverter G4, to AND gate G5 and at contacts SA2 completes a holding circuit for itself dependent on a holding ground in the exchange line supervisory element ELS provided via contacts OC1. Subsequent to the receipt of the "stop" signal over the program data highway S1, the common sequencer SEQ, FIG. 1, returns a "read" signal over the program data highway R1. This signal passes over the connecting lead 115 to AND gate G5 to cause the exchange line unit storage means STE to register the wanted extension identity staticized on the identity highways EID, and applied to it over the connecting leads indicated at 116. Registration of the wanted extension identity by the storage means STE, effects the setting of the switch SW to the wanted extension line, to which ringing is applied from the operator's console in known manner by operation of the operator's "call" key, not shown. Meanwhile the master scanner has resumed its scanning action and at the end of the first complete scanning cycle applies a release pulse over the program data highway REL and the connecting lead 117 to operate AND gate G7, from whose output the release pulse is applied to re-set the bi-stable TT and, over lead 118 to re-set the register store STO. Bi-stable TT, resetting releases relay AS and removes the priming input to AND gate G3, and relay AS releasing, at contacts AS1, removes the allotting signal from the exchange line unit ELU, over lead 114. Thus, upon restoration of the register coupling key KOC, relay CO releases, disconnecting the ground input signal to AND gate G1 of the bi-stable TT and the operator's register is now free for use on another call. The exchange line unit remains held from the exchange line supervisory apparatus for the duration of the call.

Figure 3:
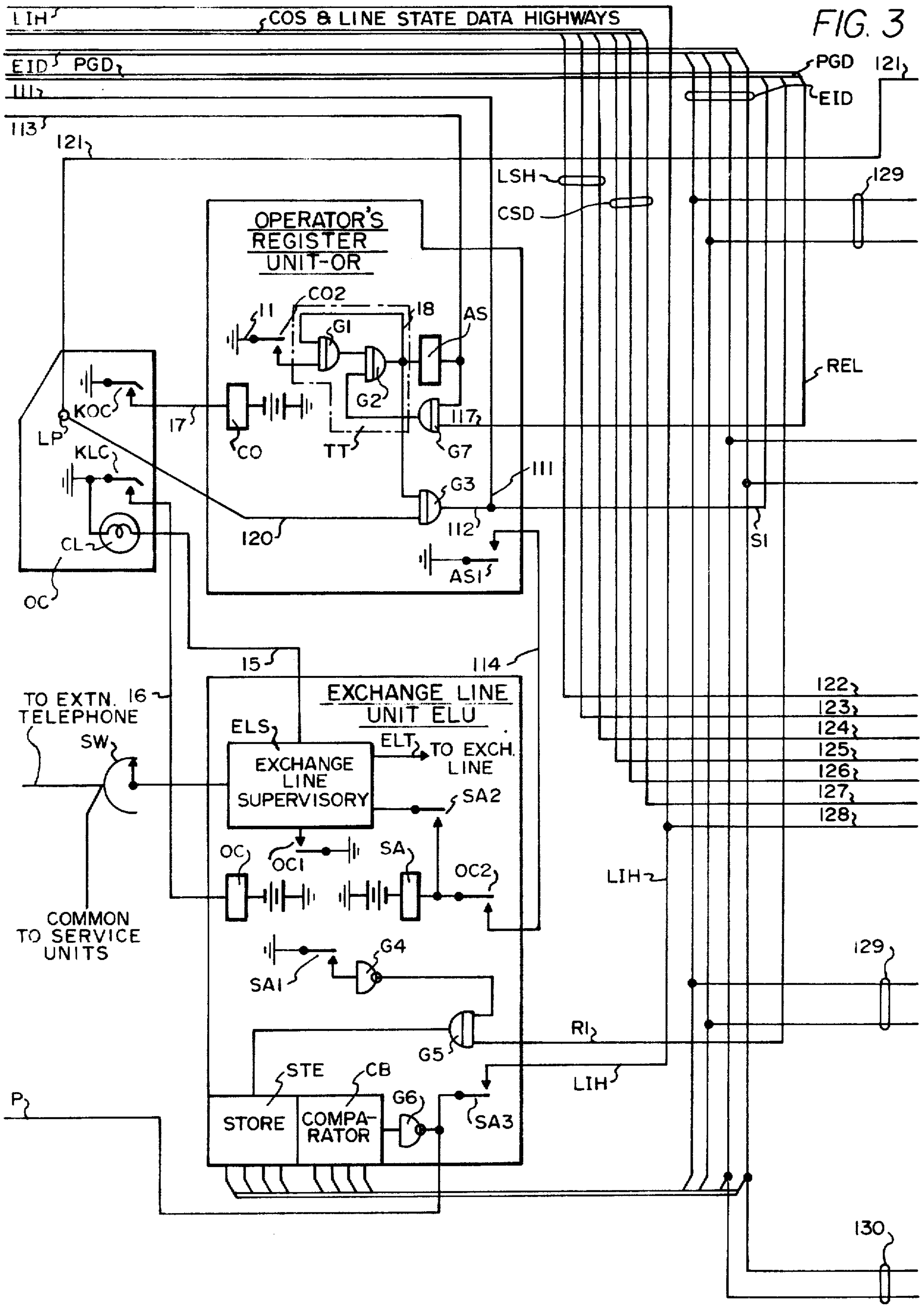
Figures 4, 4A, 4B:
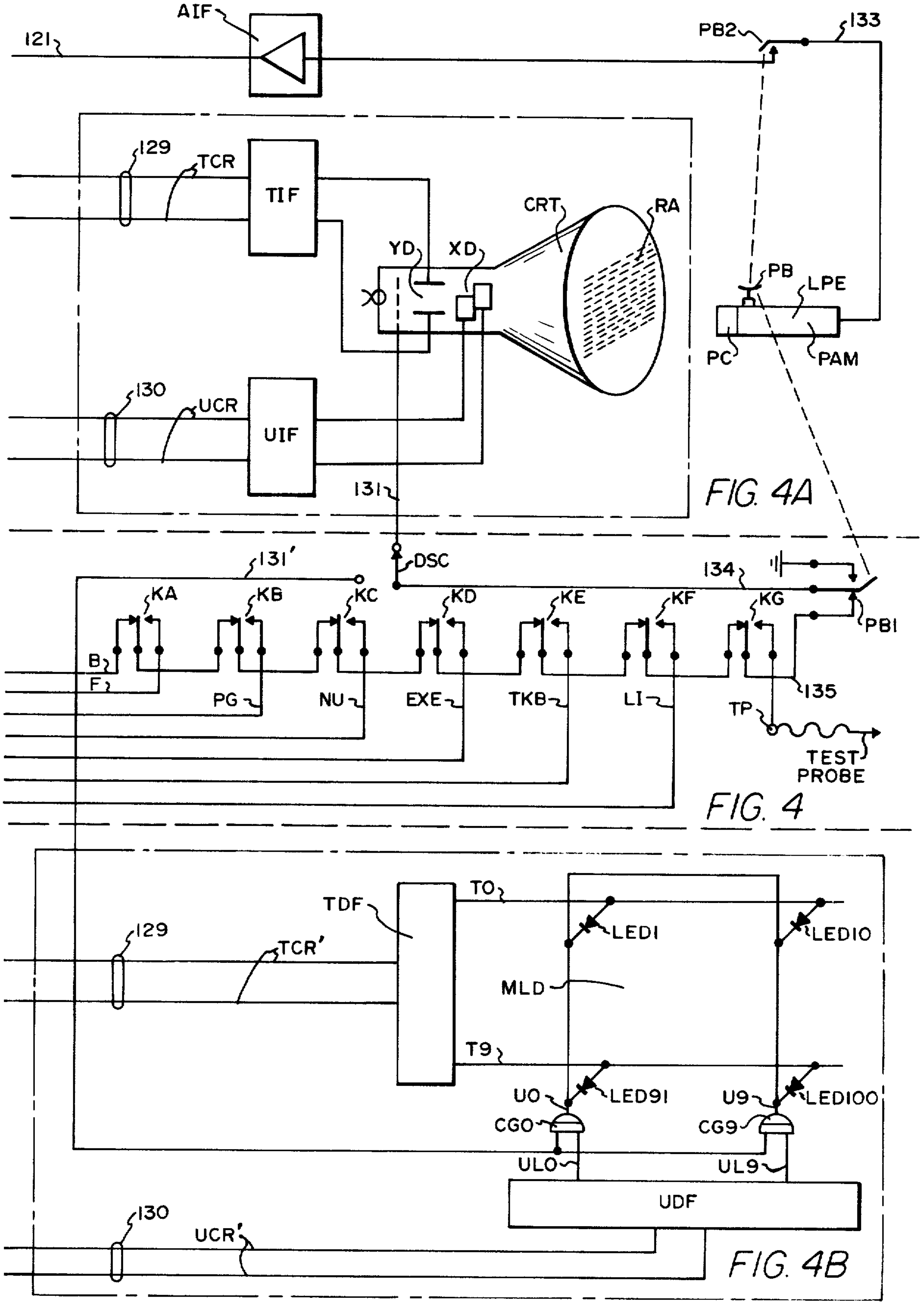

Referring now to FIGS. 3, 4, 4A and 4B, FIGS. 4A and 4B show alternative display arrangements suitable for use in carrying out the present invention, while FIG. 4 shows a method of deriving an exchange switch setting signal from the display means shown in FIGS. 4A or 4B, together with a chain arrangement of key switches for the application of a control signal or signals to the display arrangements of FIGS. 4A or 4B. FIG. 3 provides branch connecting leads 122 – 128 which extend between respective line state and class-of-service highways and respective ones of the terminals B (busy), F (free), PG (parked), NU (number unobtainable), EXE (Executive), TKB (trunks barred), and LI (line identification). These terminals are arranged to be strapped to the corresponding designated terminals in FIG. 4. Similarly the extension identity highways EID are extended over tens and units connecting lead groupd 129 and 130 to respective ones of the terminal groups TCR and UCR (FIG. 4A) or TCR' and UCR' (FIG. 4B).

FIG. 4A illustrates, diagrammatically, a cathode ray tube display means CRT while FIG. 4B shows a display means which comprises a matrix MLD of light emitting diodes. Each of these display means is arranged to be driven from the tens and units input signals applied from the exchange extension identity highways EID, FIG. 3, over the connecting lead groups 129 and 130. Either the CRT display or the matrix MLD display may be utilized by the proper positioning of movable contact DSC. Thus, in FIG. 4A, the X beam deflecting elements XD of the cathode ray tube CRT are connected to the outputs from a units interface circuit element UIF to whose input terminals UCR the units part of the extension identity codes is applied from the extension identity highways EID over the connecting leads 130, while the Y beam deflecting elements YD are connected to the outputs from a tens interface circuit element TIF, to whose input terminals TCR the tens part of the extension identity codes is applied over the connecting leads 129. The tens and units interface elements TIF and UIF may each comprise staircase voltage waveform generating means of known form, arranged to be stepped in synchronism with the applied tens or units code marking signals. Thus a 10 × 10 raster RA of 100 points or areas is marked out on the CRT screen, synchronously with the scanning of the exchange extension telephone lines by the master scanner, so that each point or area represents, by its disposition within the raster the address of a corresponding extension telephone served by the exchange.

Similarly, in FIG. 4B, the matrix MLD comprises 100 light emitting diodes arranged in 10 × 10 row and column formation, as indicated in the diagram by the light emitting diodes LED1 – LED10 for the first row and LED91 – LED100 for the tenth row. The diodes are connected at the cross points formed by a coordinate array of tens and units conductors T0 – T9 and U0 – U9, respectively. The tens co-ordinate conductors are energized successively and cyclically from the tens extension identity leads 129, FIG. 3, via the terminal group TCR' and an amplifier interface element TDF, while the units co-ordinate conductors are energized from respective ones of a group of 10 AND gates CG0 – CG9, of which only the gates CG0 and CG9 are shown. These gates each have a first input connected in common to an information signal input conductor 131', and a second input connected to respective ones of a group of units conductors UL0 – UL9, which are energized successively and cyclically from the units extension identity connecting leads 130, FIG. 3, via the terminal group UCR' and an amplifier interface element UDF. Thus, each light emitting diode represents by its disposition within the matrix MLD, the address of the corresponding extension telephone served by the exchange.

The display means of FIGS. 4A and 4B may be provided with a suitably apertured escutcheon plate with the apertures positioned to correspond with the extension identifying areas or elements of the display means, the corresponding extension identity being printed or engraved adjacent each aperture. However, the need for an apertured escutcheon plate may be avoided, in the case of FIG. 4A by arranging for the cathode ray tube to be programmed to write the relevant address digits within each address identifying area of the screen, such cathode ray tube programming arrangement, employing read-only memories, being already well known in the video display art. Alternatively, the address identifying digits could be printed or etched over the respective areas of the screen. In the case of FIG. 4B, digital elements of known form could be used.

FIG. 4 shows a chain connected group of key switches, designated KA, KB, KC, and so on to KG. These serve to enable any one of the information highway connecting leads 122 – 128, FIG. 3, to be connected to an information input signal lead 131 or 131' to the display means of FIGS. 4A or 4B. In addition, FIG. 4A shows a so-called "light-pencil" arrangement which may be utilized to reproduce, from an illuminated element or area of the display means FIGS. 4A or 4B, a signal pulse which occurs in a time slot which corresponds to the extension telephone identity then being generated by the exchange master scanner and which, as described in more detail below, may be utilized to effect the setting up of an internal connection to that extension line by the switching apparatus of the exchange.

The light-pencil LPE comprises a pencil like holder having a photo-cell PC located at one end thereof and which houses a push button switch PB, having a changeover contact set PB1 and a make contact set PB2, and a pre-amplifier PAM, and the arrangement includes the push button contacts PB1 and PB2 and an amplifier interface element AIF, whose output is connected to the terminal LP. The light-pencil LPE and its associated push button switch and interface amplifier are intended as optional apparatus depending upon whether the conventional method of operator setting up of internal connections using a key-pad or dial as described above, or the light-pencil method described below, is preferred.

Each of the keys KA – KG provides a changeover contact action, the moving contact carrying element of which is associated with respective "break" and "make" fixed contact carrying elements. The moving contact element of each key is connected to the break contact element of the succeeding key, the last key switch of the chain being connected, either directly or via the changeover contact set PB1 of the push button PB incorporated in the light-pencil LPE. The break and make contact elements of key switch KA are connected respectively to the "B" and "F" terminals, while terminals PG, NU, EXE, TKB, and LI are connected respectively to the "make" contact elements of key switches KB to KF, the make contact of key switch KG being connected to a terminal TP to which a test probe is connected.

Considering firstly, the line condition display mode of operation of FIGS. 4, 4A and 4B, as previously described, the terminals B, F, PG, NU, EXE, TKB and LI, FIG. 4, are strapped to the correspondingly designated terminals of FIG. 3, to which the busy, free, PG, NU, EXE, TKB and LI data highways are connected over respective ones of the connecting leads 122 – 129. As each extension line served by the exchange is scanned by the master scanner, its line state, i.e. busy, free, PG (parked), will be ascertained by the line state discriminator element, FIG. 1, which applies a corresponding pulse signal to the appropriate line state data highway. Similarly, the class-of-service translator determines the class-of-service (i.e. NU, EXE, or TKB) of each extension line as it is scanned and applies a corresponding pulse signal to the appropriate class-of-service data highway. Also, for each operator connected trunk call, a pulse signal will be applied to the line identification highway LI, from the respective exchange line units, the signal being applied from the respective comparators CB, via contacts SA3 of an operator coupled allotting relay SA and connecting lead 132. Thus the signal pulses occur on these information data highways in time division multiplex, in time slots determined by the master scanner and since the display of FIGS. 4A or 4B is driven in step with the master scanner, the pulse signals on the information data highways will coincide with respective beam positions of the cathode ray tube display means of FIG. 4A or with the priming of the respective units control gate CG0 – CG9 of the light emitting diode display means of FIG. 4B.

With the key switches KA – KG and the push button contacts PB1 (FIG. 4) in their normal positions shown, information signal pulses from the busy line state data highway are applied over connecting lead 122, the strapped terminals B, the chain connected key switch contact elements and lead 131 or lead 131' depending upon whether the display means of FIGS. 4A or 4B is provided. Thus, the signal pulses on lead 131 are applied to the control electrode of the cathode ray tube CRT (FIG. 4A) to cause respective spots or areas of the raster RA to glow visibly. Whereas, the signal pulses on lead 131' are applied to the gates CG0 – CG9, of the light emitting diode display means (FIG. 4B), as these are primed during particular tens and units cycles of the interface drive elements TDF and UDF thereby causing respective ones of the light emitting diodes LED1 – LED100 to glow visibly. Consequently, in this normal condition of the key switches KA – KB, the display means of FIGS. 4A or 4B indicate by the visibly glowing areas or elements thereof, the identities of all lines served by the exchange whose line condition is busy. By operating the key KA, the lead 131 or 131' is connected, in a similar manner to that just described, to the free line state data highway, to cause the display to be changed to indicate all extension lines whose line state is free, thus enabling an operator to check that a wanted extension line is, in fact, free and is not a PG or NU line. Similarly, by operating respective ones of the keys KB to KF an indication will be provided which indicates the identities of all lines to which the respective line condition or class-of-service applies. For instance, by operating key KB, a display is provided which indicates the identities of all lines which are PG (parked). This is useful in recognizing telephones left off-hook, and in checking the validity of extensions to be allocated for night service or as a maintenance aid to identify troubles in cables giving rise to a large number of PG line conditions in a particular number group. Again, by operating key KF, the operator can ascertain the identities of all extensions engaged on external trunk calls set up via the switchboard, thereby giving the operator guidance as to whether she should interrupt on a particular busy extension telephone for which an incoming trunk call has arisen. The key KG is connected via a terminal TP to a test probe, thereby enabling the display means to be usefully employed by a maintenance engineer in checking the operation of the control and service units of the exchange. Preferably, the keys KA to KF are of the non-locking (i.e. self restoring) kind while the key KG is of the locking (i.e. manually restorable) kind, as indicated in FIG. 4.

Considering now the switch setting mode of operation of the display arrangements shown in FIGS. 4, 4A and 4B, an operator wishing to set a connection to an extension line served by the PABX, uses the light-pencil LPE, FIG. 4, to send the wanted extension identity to the exchange switching apparatus, instead of keying or dialing the extension identifying digits, as previously described. Thus, to set such a connection, the operator takes up the light-pencil LPE, operates the push button PB thereon and then applies the photo-cell carrying end of the light-pencil to the respective area or element of the display means. Operation of the push button PB, at its contacts PB1, applies a ground potential over lead 131 or 131' to the control input to the display means of FIGS. 4A or 4B and at its contacts PB2 completes a path from the output of the light-pencil preamplifier to the amplifier interface element AIF. In the case of FIG. 4A, the ground potential on lead 131 is applied to the control grid of the cathode ray tube CRT to cause all the subscriber identifying points or areas of the raster RA to be stimulated sequentially, and by applying the photo-cell PC over a particular point or area, output pulse signals are produced by the light-pencil, in the scanner time slot appertaining to wanted extension. It may be noted that the photo-cell PC is mainly responsive to the ultra-violet emission from the cathode ray tube screen and consequently the pulse produced by the light-pencil is unaffected by "after-glow" of the visible light emission. Similarly in the case of FIG. 4B, the ground potential on lead 131' causes the gates CG0 – CG9 to be continuously primed so that each of the light emitting diodes LED1 to LED100 forming the matrix MLD is energized sequentially under control of the tens and units extension identifying codes as these are generated by the master scanner, so that by placing the light-pencil over the respective light emitting diode, an output pulse will be provided in the time slot appertaining to the wanted extension identity.

It will be noted, that the signal pulse generated by the light-pencil LPE, as described above is, effectively, the same as that produced by the comparator CA in the operator's register OR, previously described with respect to the circuit of FIG. 2. Thus, in the setting up of an incoming trunk call to a wanted extension line, the operator proceeds as previously described, to first couple her position to the respective exchange line unit ELU, FIG. 3, by operation of key KLC, and upon ascertaining the identity of the wanted extension line, then couples her position to an operator's Register Unit OR. She then operates the push button on the light-pencil PB to cause all extension identities to be displayed by the display means, and then applies the photo-cell carrying end of the light-pencil over the respective element or area of the display means. The light-pencil responds by applying an output pulse, in the respective extension identifying time slot, over lead 133, push button contact PB2, operated, the interface amplifier element AIF, lead 121, terminal LP in the operator's console (FIG. 3), lead 120, AND gate G3, connecting lead 112 and the stop data highway S1, to stop the sequencer and thereby staticize the wanted extension identity on the identity highways EID. This identity is then read into the coupled exchange line unit store STE and the connection to the wanted extension line proceeds in the manner previously described for the key-pad or dial method of call setting.

It will be appreciated by those skilled in the art that the display arrangements described herein, may be refined in a number of ways. For example each of the tens and units interface elements TIF, UIF, FIG. 4A, or TDF, UDF, FIG. 4B may incorporate decade counters arranged to be driven by clock pulses from the exchange raster oscillator and synchronized from the master scanner, thereby enabling the tens and units groups of code marking leads 129 and 130, FIG. 3, to be replaced by only two highways one being a clock pulse highway and the other a synchronizing pulse highway, the decade counters within the interface units serving to generate the extension line identities in step with the master scanner. Similarly, the information signal connecting leads 122 – 128, may be gated, via "AND/OR" gating on to a single information data highway, extending between the switching apparatus and the display means, the display selecting keys KA – KG, FIG. 4, being arranged to apply signals, over three signalling leads in binary code, and decoded to prime a respective one of the "AND" gates in the AND/OR gating arrangement. In this way the total number of signal leads required to extend between the switching apparatus and the display means associated with the operator's position, in the example described may be reduced to only six, of which three are pulse signal highways and three are steady state signal connecting leads. Again, since the power required for the display arrangements described is very small, this can be taken from the exchange apparatus power supply over additional power supply leads, thus rendering the provision of a separate power supply for the display means, unnecessary.

In the case of the cathode ray tube display arrangement of FIG. 4A, it is possible, by the injection of suitable signals in the X and Y raster generating wave forms, synchronously with the exchange generated information pulse signals, to cause each line identity display to take the form of any one of a number of different symbols, whereby pertinent information regarding a line identity may be indicated by the form of the symbol displayed in the display area allocated to that line. Thus, in FIG. 4A, by injecting a suitable sinusoidal wave form of appropriate phase, into the step wave form applied from the interface elements to the X or Y (or both) beam deflecting plates, under control of the relevant information pulse signal, then the symbol displayed may be either a horizontal line, an oblique line, a vertical line or a circle, the arrangement being that one or other of these symbols would be displayed to indicate a respective line condition, for example, busy on local, busy on trunk, P.G. line, N.U. line, and so on. In this way any one of a number of different line conditions may be displayed without the need for push button switching means to discriminate between the different information displays.

It will also be appreciated that the invention is not restricted to use with the particular PABX system herein described, but could be applied to any system which employs line scanners, and state-of-line and class-of-service discrimination means, since such information, if not provided on a time division multiplex basis, can readily be converted to this form, for example by means of shift register or like stores arranged for parallel write-in and serial read-out, under the line scanner control. Similarly, for the call setting function using a light-pencil, the TDM pulse output from the light-pencil could readily be translated to respective digital codes which could be stored by the switching apparatus as required to suit the method of call setting employed. Again, other items of information may be displayed. For example, the exchange system may employ shift register or like storage arrangements into which data bits are inserted to indicate that the respective extensions are awaiting free trunk lines for outgoing calls, or that respective extensions have temporarily moved to the location of another extension (changed number facility). The display of such information to an operator of a telephone exchange would provide very material benefits, in enabling the extent of congestion on the trunk lines to be readily assessed at any time, and in enabling an operator to keep track of the movement of the executives about an office building.

What is claimed is:

1. An arrangement for the display of information appertaining to the lines served by a telephone exchange, each said line having a corresponding address, which comprises an electronic display means composed of an array of light emitting elements or areas the spatial disposition of which within the array is indicative of a corresponding telephone line address, said display means being capable of displaying information by the stimulation of said particular elements or areas thereof to a light emitting condition, one or more data signalling highways linking said display means to the switching apparatus of said telephone exchange, interface means for priming sequentially, in synchronism with signals from an address generating means for the successive and cyclic generation of telephone line address signals, said individual elements or areas of said display means allocated to predetermined telephone lines served by said exchange, and means within said exchange switching apparatus for generating line information signals in time division multiplex under control of said address generating means, each information signal appertaining to a particular line address, said information signals, together with synchronizing signals from said address generating means being applied to said display means via said one or more data signalling highways, each said information signal being so synchronized to said address generating means that in accordance with the particular element or area of said display means that is stimulated to said light emitting condition the identity of the corresponding telephone line can be determined.

2. The display arrangement as claimed in claim 1, including manually operable means for applying to said display means a continuous control signal whereby each element or area of the display is stimulated to a light emitting condition when primed sequentially by said interface means, and light responsive means manually movable into operative relation with any one of said elements or areas corresponding to a called telephone line served by said exchange, whereby upon stimulation of said element or area to a light emitting condition said light responsive means emits a line address marking signal the time of occurrence of which with respect to the line address generation indicates the address of the called telephone line, and said telephone exchange switching apparatus including means responsive to such a line address marking signal for establishing a switched connection to said called telephone line.

3. The display arrangement as claimed in claim 1, in which said line information signal generating means is arranged to generate a plurality of sets of information signals, each set of signals being indicative of a corresponding line state of each of said telephone extension lines served by said exchange switching apparatus, said display means including manually operable switching means for optional selection of any one of said sets of signals to be applied to said display means.

4. The display arrangement as claimed in claim 1, in which said line information signal generating means is arranged to generate a plurality of sets of information signals, each set of signals being indicative of a corresponding line class-of-service of each of said telephone lines served by said exchange switching apparatus, said display means including manually operable switching means for optional selection of any one of said sets of signals to be applied to said display means.

5. The display arrangement as claimed in claim 1, in which said display means includes a cathode ray tube and a plurality of means for stimulating areas of said cathode ray tube into corresponding distinctively different light emitting patterns, and said line information signal generating means is arranged to generate a plurality of sets of information signals, each set of signals being indicative of a corresponding line state of each of the telephone extension lines served by said exchange switching apparatus, means being provided to transmit each of said sets of signals to a corresponding one of said plurality of stimulating means.

6. The display arrangement as claimed in claim 1, in which said display means includes a cathode ray tube and a plurality of means for stimulating areas of said cathode ray tube into corresponding distinctively different light emitting patterns, and said line information signal generating means is arranged to generate a plurality of sets of information signals, each set of signals being indicative of the class-of-service of each of the telephone extension lines served by said exchange switching apparatus, means being provided to transmit each of said sets of signals to a corresponding one of said plurality of stimulating means.

* * * * *